(12) United States Patent
Parris et al.

(10) Patent No.: US 7,606,093 B2
(45) Date of Patent: Oct. 20, 2009

(54) OPTIMIZED CHARGE SHARING FOR DATA BUS SKEW APPLICATIONS

(75) Inventors: Michael C. Parris, Colorado Springs, CO (US); Kim C. Hardee, Colorado Springs, CO (US)

(73) Assignees: United Memories, Inc., Colorado Springs, CO (US); Sony Corporation, Tokyo (JP)

( * ) Notice: Subject to any disclaimer, the term of this patent is extended or adjusted under 35 U.S.C. 154(b) by 174 days.

(21) Appl. No.: 11/759,823

(22) Filed: Jun. 7, 2007

(65) Prior Publication Data

US 2008/0174340 A1    Jul. 24, 2008

Related U.S. Application Data

(63) Continuation-in-part of application No. 11/625,728, filed on Jan. 22, 2007.

(51) Int. Cl.
G11C 7/00 (2006.01)
(52) U.S. Cl. .................. 365/203; 365/205
(58) Field of Classification Search .......... 365/203, 365/205
See application file for complete search history.

(56) References Cited

U.S. PATENT DOCUMENTS

| | | | | |
|---|---|---|---|---|
| 6,134,153 | A * | 10/2000 | Lines et al. | 365/189.02 |
| 6,434,079 | B2 * | 8/2002 | Kim | 365/230.02 |
| 7,443,752 | B2 * | 10/2008 | Ha | 365/208 |
| 2006/0171211 | A1 * | 8/2006 | Shin | 365/189.02 |
| 2007/0014171 | A1 * | 1/2007 | Ha | 365/208 |
| 2007/0182451 | A1 * | 8/2007 | Kim | 326/82 |

OTHER PUBLICATIONS

Yamauchi, Hiroyuki, Akamatsu, Hironori, Fujita, Tsutomu, An Asymptotically Zero Power Charge-Recycling Bus Architecture for Battery-Operated Ultrahigh Data Rate ULSI's, IEEE Journal of Solid-State Circuits, vol. 30, No. 4, Apr. 1995, pp. 423-431.

(Continued)

Primary Examiner—Michael T Tran
(74) Attorney, Agent, or Firm—Peter J. Meza; William J. Kubida; Hogan & Hartson LLP

(57) ABSTRACT

A circuit and method provide a charge sharing function during skewed data bus conditions in an integrated circuit memory. The charge sharing circuit includes two additional circuit blocks, one coupled to each of the capacitive lines in the charge-sharing line set, to provide the charge recycling feature. An extra clock signal is active one cycle early during a first clock period to trigger an extra drive circuit to generate a voltage differential on a first capacitive line that is similar to the voltage level generated when real data is being propagated. The presence of an extra voltage signal on the first capacitive line takes place earlier than what would normally happen and allows for proper charge sharing between a second capacitive line and the first capacitive line. Also, there is an additional control signal associated with a last clock period following normal non-skewed charge sharing. The additional control signal triggers a reference read circuit to generate data and a voltage on the first capacitive lines similar to the voltage present during real data for proper charge sharing. The additional read and drive circuit blocks are partial copies of the normal read and drive circuits so that a matching voltage can be generated on the appropriate capacitive signal lines.

20 Claims, 8 Drawing Sheets

OTHER PUBLICATIONS

Rajapandian, Saravanan, Shepard, Kenneth L., Hazucha, Peter, Karnik, Tanay, High-Voltage Power Delivery Through Charge Recycling, IEEE Journal of Solid-State Circuits, vol. 41, No. 6, Jun. 2006, pp. 1400-1410.

* cited by examiner

OPTIMIZED CHARGE SHARING FOR DATA BUS SKEW APPLICATIONS

RELATED CASE INFORMATION

This application is a continuation-in-part of an application entitled "Switched Capacitor Charge Sharing Technique for Integrated Circuit Devices Enabling Signal Generation of Disparate Selected Signal Values", Ser. No. 11/625,728 filed on Jan. 22, 2007.

BACKGROUND OF THE INVENTION

This invention pertains to integrated circuit memories, and, more particularly, to charge sharing circuits and methods for an integrated circuit memory.

Numerous charge sharing and charge recycling techniques are known including precharging and sharing charge between bit lines, charge recycling by switching between various power supply levels in charge pumped circuits, and various bus and circuit stacking techniques, as well as combinations of all of these techniques.

Charge sharing techniques have previously been employed in integrated circuit designs in order to save operating power. A typical circuit example is one utilized in conjunction with dynamic random access memory (DRAM) array bitlines which are precharged to a level of VCC/2 then driven to VCC (supply voltage level) or VSS (circuit ground) for the bit line (BL) and complementary bit line bar (/BL or BLB) depending on the state of the previously stored data.

Other contemporary circuit examples include the use of three groups of logic gates operating at three different voltage ranges. In operation, one group will transition from VCC/3 to VSS, the second group from 2 VCC/3 to VCC/3 and the third group from VCC to 2 VCC/3. In this manner, these three groups of logic gates can charge share with their adjacent voltage range group, but conventional designs are constrained to operate in this manner. Stated another way, with current circuit techniques the low level of signal or circuit block A is set equal to the high level of the adjacent signal or circuit block B.

Prior art charge sharing circuits, however, do not have a means for sharing charge or recycling charge in time shifted, clock pipelined circuits. Buses and signals used for charge sharing can be shifted in time by several clock periods in a highly pipelined design. Prior art circuits do not have any means for charge sharing these time shifted electrical signals.

What is desired then, is a circuit and method for efficient charge sharing in an integrated circuit memory during data bus skew applications without undesirably slowing down the data bus or adding a large amount of circuitry.

SUMMARY OF THE INVENTION

According to the present invention, a circuit and method for providing a charge sharing function during skewed data bus conditions in an integrated circuit memory overcomes the deficiency of the prior art charge sharing circuits, which are unable to recycle charge in time-shifted applications. The circuit of the present invention includes two additional circuit blocks, one coupled to each of the capacitive lines in the charge-sharing line set, to provide the charge recycling feature.

According to the present invention, an extra clock signal is active one cycle early during a first clock period to trigger an extra drive circuit to generate a voltage differential on a first capacitive line that is similar to the voltage level generated when real data is being propagated. The presence of an extra voltage signal on the first capacitive line takes place earlier than what would normally happen and allows for proper charge sharing between a second capacitive line and the first capacitive line. Also, there is an additional control signal associated with a last clock period following normal non-skewed charge sharing. The additional control signal triggers a reference read circuit to generate data and a voltage on the first capacitive lines similar to the voltage present during real data for proper charge sharing. According to the present invention, the additional read and drive circuit blocks are partial copies of the normal read and drive circuits so that a matching voltage can be generated on the appropriate capacitive signal lines.

The foregoing and other objects, features and advantages of the invention will become more readily apparent from the following detailed description of a preferred embodiment of the invention, which proceeds with reference to the accompanying drawings.

DETAILED DESCRIPTION

Figure 1:
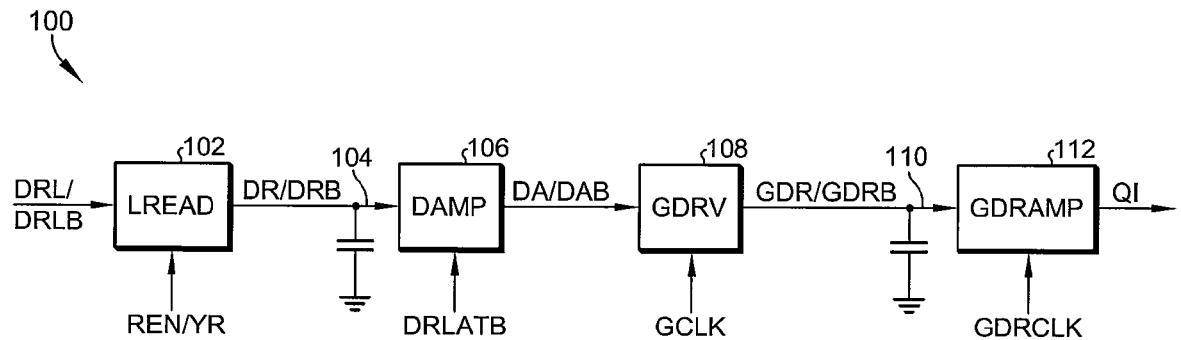
FIG. 1 is a simplified block diagram of an integrated circuit memory charge sharing circuit including a read circuit coupled to a capacitive data line and a drive circuit coupled a capacitive global data line.

FIG. 1 is a charge sharing circuit 100 that allows for selected signal, or operating, levels without concern for the number of circuit blocks used to share the charge. In other words, it is highly advantageous to provide, for example, two circuit blocks that can charge share with each other but have VCC/10 operating levels. That is, one signal or block could operate in the range of VCC to 0.9 VCC while another signal or block operates between VSS to 0.1 VCC with the two signal generators charge sharing with each other.

Referring to FIG. 1, block diagram 100 shows two long high capacitance sets of lines 104 and 110, DR/DRB and GDR/GDRB. There is a clocked pipeline stage including a DAMP circuit block 106 for receiving the DR/DRB signal and the DRLATB signal, and for providing the DA/DAB signal. The clocked pipeline stage also includes a GDRV circuit block 108 for receiving the DA/DAB signal and the GCLK signal, and for providing the GDR/GDRB signal. The clocked pipeline stage 106, 108 is coupled between the two line sets 104 and 110. Block diagram 100 also includes an LREAD circuit block 102 for receiving the DRL/DRLB and REN/YR signals, and for the providing the DR/DRB signal. Block diagram 100 also includes a GDRAMP circuit block 112 for receiving the GDR/GDRB and GDRCLK signals, and for providing the QI output signal.

Figure 2:
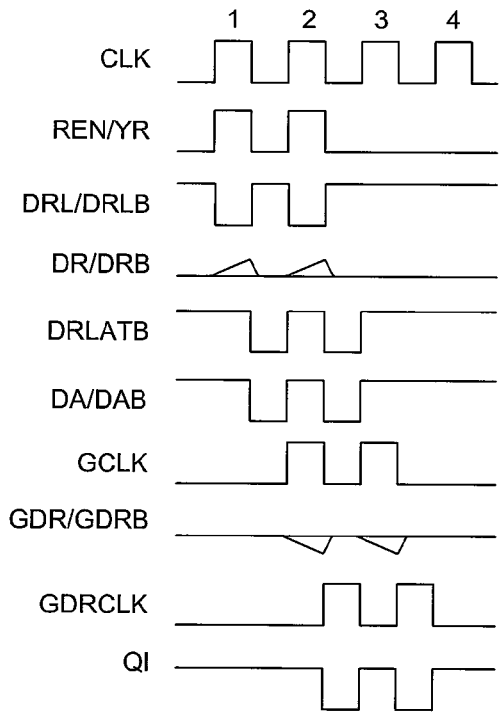
FIG. 2 is a timing diagram showing signals associated with the integrated circuit memory charge sharing circuit of FIG. 1, and in particular showing missing signals on the capacitive line set and the lack of charge recycling associated with a first and last clock cycle.

Referring to FIG. 2, the following signals associated with the circuit 100 of FIG. 1 are shown: CLK, REN/YR, DRL/DRLB, DR/DRB, DRLATB, DA/DAB, GCLK, GDR/GDRB, GDRCLK, and QI. The circuit 100 of FIG. 1 results in a time shift of one clock period between the DR/DRB and GDR/GDRB driven lines 104 and 110. As can be seen from the waveforms in FIG. 2, if charge is shared between the two sets of lines 104 and 110, an imbalance will occur during the clock cycles labeled "1" and "3". This is undesirable because the highly capacitive lines DR/DRB and GDR/GDRB or 104 and 110 are charge-shared with each other. If only one set of these signals is active, then an imbalance in the charge or current consumed exists. If this imbalance occurs then a shift in the VEQ1 and VEQ2 voltage levels will result. The VEQ1 and VEQ2 voltage levels are explained in further detail below.

Figure 3:
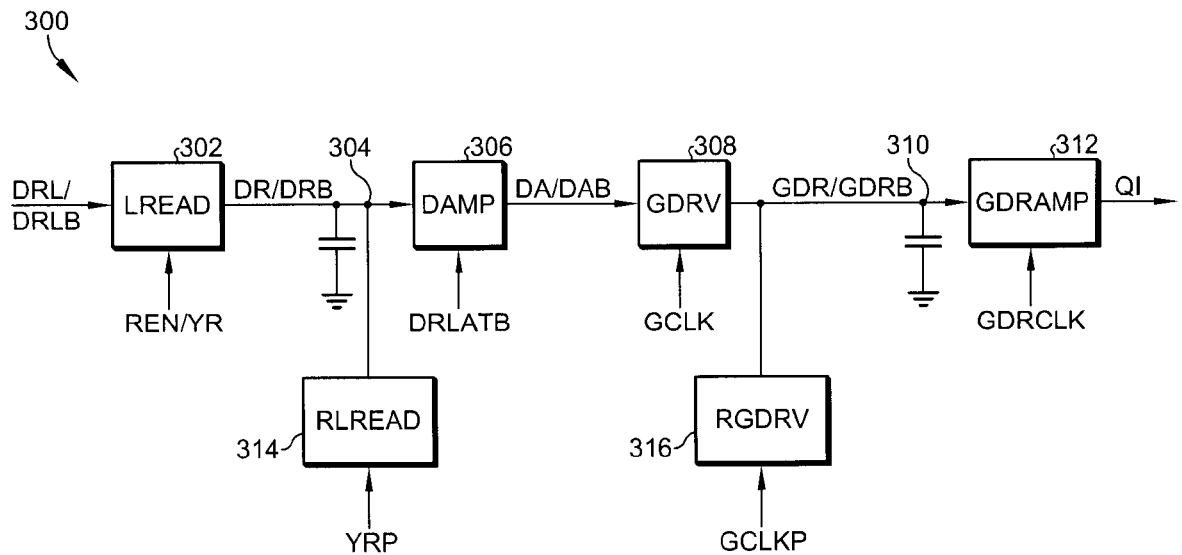
FIG. 3 is a simplified block diagram of an integrated circuit memory charge sharing circuit including a read circuit coupled to a capacitive data line and a drive circuit coupled to a capacitive global data line, as well as additional copies of the read and drive circuits according to the present invention.

FIG. 3 is a simplified block diagram of an integrated circuit memory charge sharing circuit 300 including an LREAD read circuit 302 coupled to a capacitive data line 304 and a GDRV drive circuit 308 coupled to a capacitive global data line 310. The input and output signals of circuits 302 and 308 generally correspond to the previously identified input and output signals of circuits 102 and 108, respectively, as previously described. Circuit 300 of FIG. 3 also includes circuits 306 and 312 that generally correspond to circuits 106 and 112, respectively, as previously described. Circuit 300 also includes, according to the present invention, additional copies of the read and drive circuits. The additional circuits are the RLREAD read circuit 314 coupled to the capacitive data line 304 and receiving the YRP signal, and the RGDRV drive circuit 316 coupled to the capacitive global data line 310 and receiving the GCLKP signal.

Figure 4:
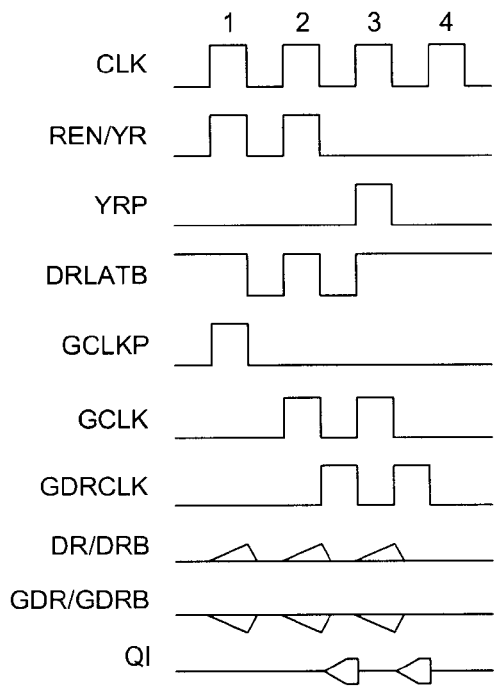
FIG. 4 is a timing diagram showing signals associated with the integrated circuit memory charge sharing circuit of FIG. 3, and in particular showing additional signals on the capacitive line set and the presence of charge recycling associated with all clock cycles.

FIG. 4 is a timing diagram showing signals associated with the integrated circuit memory charge sharing circuit of FIG. 3, and in particular showing additional signals on the capacitive line set and the presence of charge recycling associated with all clock cycles. The signals shown in FIG. 4 are the CLK, REN/YR, YRP, DRLATB, GCLKP, GCLK, GDRCLK, DR/DRB, GDR/GDRB, and QI signals. As previously described, the YRP and GCLKP are additional signals used according to the present invention that are not present in the circuit of FIG. 1.

The waveforms pictured in the timing diagram of FIG. 4 show an extra GCLKP signal active one cycle early during clock period 1 to trigger the extra GDRV circuit, RGDRV circuit 316, or "reference GDRV" to generate a voltage differential on the GDR/GDRB lines 310 similar to the voltage level generated when actual data is propagated. The GCLKP signal is generated earlier than what would normally happen to allow for proper charge sharing between the DR/DRB lines 304 and the GDR/GDRB lines 310, according to the present invention. Also, there is an additional YR signal, YRP, in clock period 3 following the two valid YR pulses. The YRP signal causes the RLREAD ("reference LREAD") circuit 314 to supply extra data to generate a voltage on the DR lines 304 similar to the voltage present during actual data for proper charge sharing.

In the example of FIG. 4, a burst length of two is used. However, it will be clear to those skilled in the art that a burst length of any arbitrary number of bits can be used. However, the burst length is carefully chosen as required by a given application, as "extra" unnecessary data will burn additional power. Referring to FIG. 4, a third QI bit would come out if GDRCLK is toggled a third time. If the pipeline stages were off by two clock cycles instead of one as is shown in FIG. 4, then two YRP and GCLKP pulses would be required. It is important to note that for longer burst lengths, such as 64 or 128 bit burst lengths, the overhead of extra YRP or GCLKP pulses becomes less. In other words, in the examples of FIGS. 3 and 4, the technique of the present invention would seem to proportionally add quite a bit of circuit overhead and cost to the integrated circuit memory. In actuality, if 64 or 128 bit burst lengths are used, the additional overhead is proportionally quite small.

Examples of circuits suitable for use in the RLREAD and RGDRV circuit blocks 314 and 316 are shown in the attached schematics of FIGS. 5 and 6 and are described in detail below. Circuit blocks 314 and 316 are partial copies of the LREAD and GDRV circuits 302 and 308 so that a matching voltage can be generated on the appropriate signal lines according to the present invention.

Figure 5:
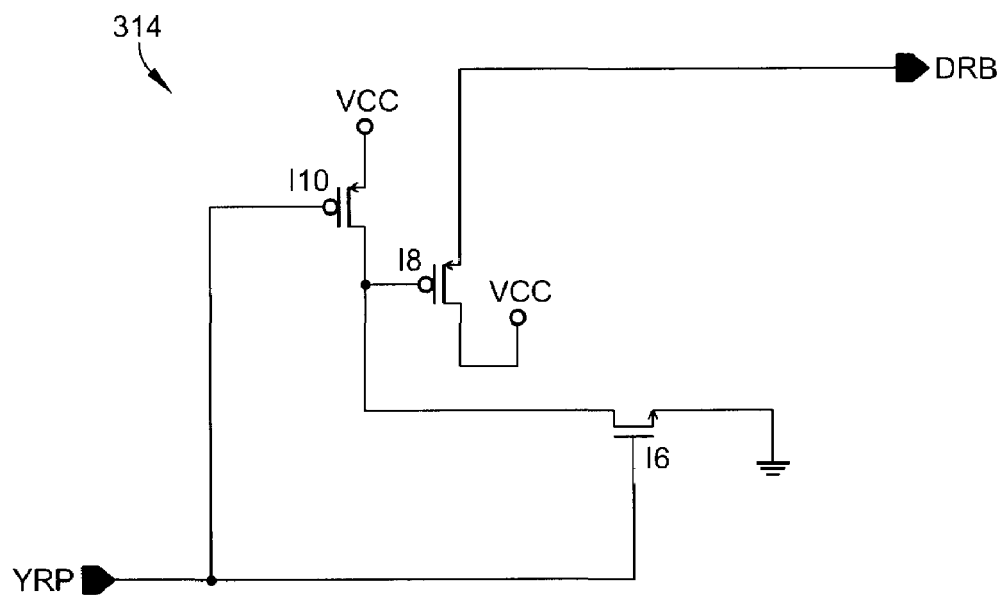
FIG. 5 is a schematic diagram of a duplicate read circuit suitable for use in the charge sharing circuit of FIG. 3, according to the present invention.

FIG. 5 is a schematic diagram of a duplicate or reference read circuit 314 suitable for use in the charge sharing circuit 300 of FIG. 3, according to the present invention. Duplicate or reference read circuit 314 includes P-channel transistors I10 and I8, and an N-channel transistor I6. Read circuit 314 receives the YRP signal, which is coupled to the gates of transistors I10 and I6. Read circuit 314 provides the DRB signal at the source/drain of transistor I8. In operation, read circuit 314 provides an additional signal to the DR/DRB capacitive line 304 in response to YRP signal in order to provide signal or voltage separation on the DR/DRB lines that can be shared with the GDR/GDRB lines, according to the present invention and as is shown in the timing diagram of FIG. 4.

Figure 6:
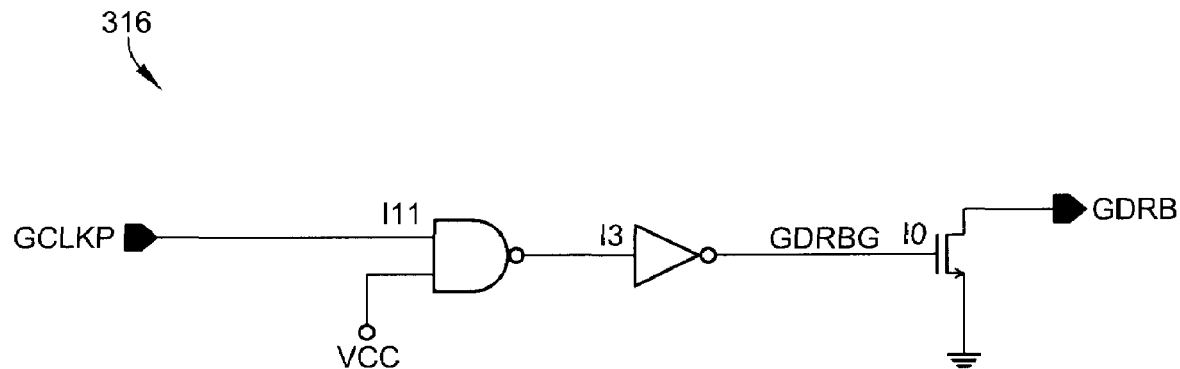
FIG. 6 is a schematic diagram of a duplicate drive circuit suitable for use in the charge sharing circuit of FIG. 3, according to the present invention.

FIG. 6 is a schematic diagram of a duplicate drive circuit 316 suitable for use in the charge sharing circuit 300 of FIG. 3, according to the present invention. Duplicate drive circuit 316 includes series-coupled AND gate I11, inverter I3, and N-channel transistor I0. Drive circuit 316 receives the GCLKP signal at the input of AND gate I11. Drive circuit 316 provides the GDRB signal at the source/drain of transistor I0. In operation, drive circuit 316 provides an additional signal to the GDR/GDRB capacitive line 310 in response to the GCLKP signal in order to provide signal or voltage separation on the GDR/GDRB lines that can be charge shared with the DR lines, according to the present invention and as is shown in the timing diagram of FIG. 4.

Figure 7:
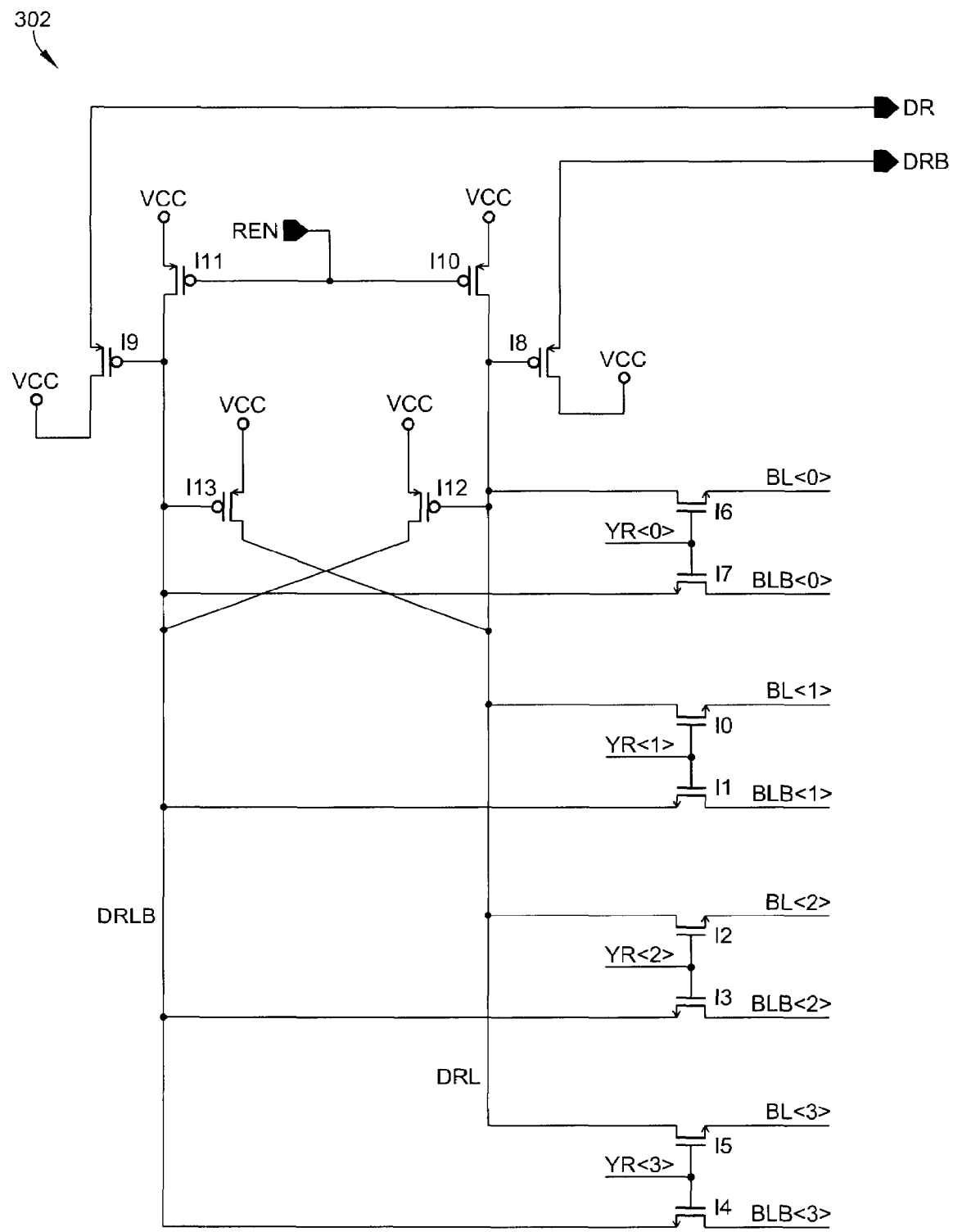
FIG. 7 is a schematic diagram of a read circuit suitable for use in the charge sharing circuit of FIG. 3, according to the present invention.

FIG. 7 is a schematic diagram of a read circuit 302 suitable for use in the charge sharing circuit 300 of FIG. 3, according to the present invention. Read circuit 302 includes N-channel transistor pairs I6/I7, I0/I1, I2/I3, and I4/I5 for receiving the complementary data inputs BL<0>/BLB<0>, BL<1>/BLB<1>, BL<2>/BLB<2>, and BL<3>/BLB<3>, controlled at the common gate thereof by the YR<0>, YR<1>, YR<2>, and YR<3>, control signals. In response to the YR controls signals, the complementary data input is selectively coupled on to the DRL and DRLB lines. In turn, the data on the DRL and DRLB lines is driven onto the DR and DRB lines with the circuit including cross-coupled P-channel transistors I12 and I13, and N-channel transistors I8, I9, I10, and I11. In operation, read circuit 302 provides the current drive capability for driving capacitive drive lines DR/DRB.

Figure 8:
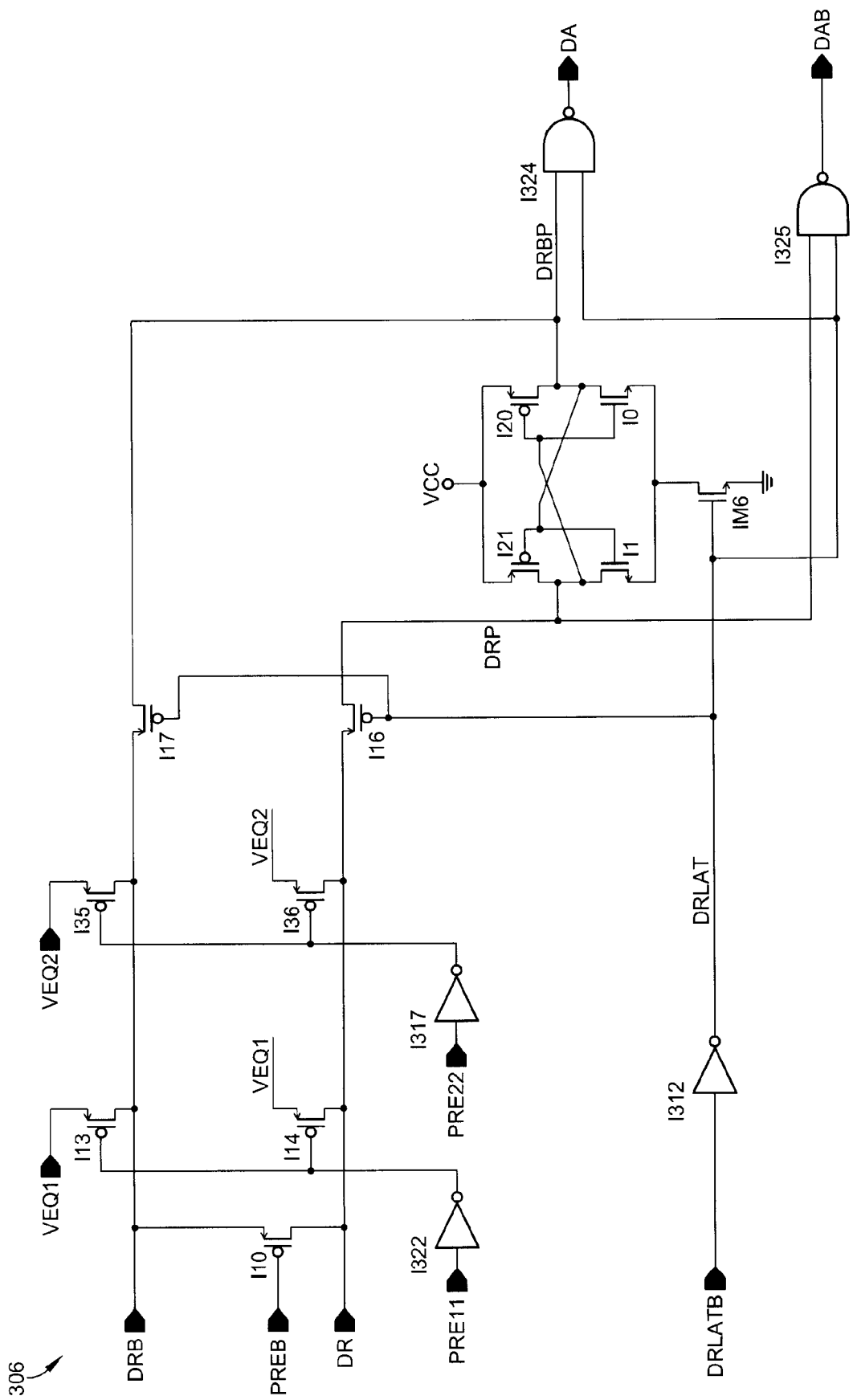
FIG. 8 is a schematic diagram of a local data amplifier circuit suitable for use in the charge sharing circuit of FIG. 3, according to the present invention.

FIG. 8 is a schematic diagram of a local data amplifier circuit 306 suitable for use in the charge sharing circuit 300 of FIG. 3, according to the present invention. Data amplifier circuit 306 includes P-channel transistor I10 coupled across the DRB and DR lines, a precharge circuit including P-channels transistors I13 and I14, and inverter I322 for receiving the PRE11 control signal to equalize the DRB and DR lines to the VEQ1 voltage, and a precharge circuit including P-channels transistors I35 and I36, and inverter I327 for receiving the PRE22 control signal to equalize the DRB and DR lines to the VEQ2 voltage. Amplifier circuit 306 also includes P-channel transistors I16 and I17 interposed between the DR/DRB lines and the DRP/DRBP lines, and controlled at the gates thereof by the DRLAT signal provided by inverter I312. The signals on lines DRP/DRBP are driven on to the DA/DAB lines by the circuit portion including cross-coupled P-channel transistors I20/I21, cross-coupled N-channel transistors I0/I1, switched N-channel transistor IM6, and NAND gates I324 and I325. In operation, amplifier 306 is used to amplify the DR/DRB signals onto the DA/DAB lines, for the purpose of bringing the small signal DR lines to full CMOS levels and inserting a pipeline delay stage.

Figure 9:
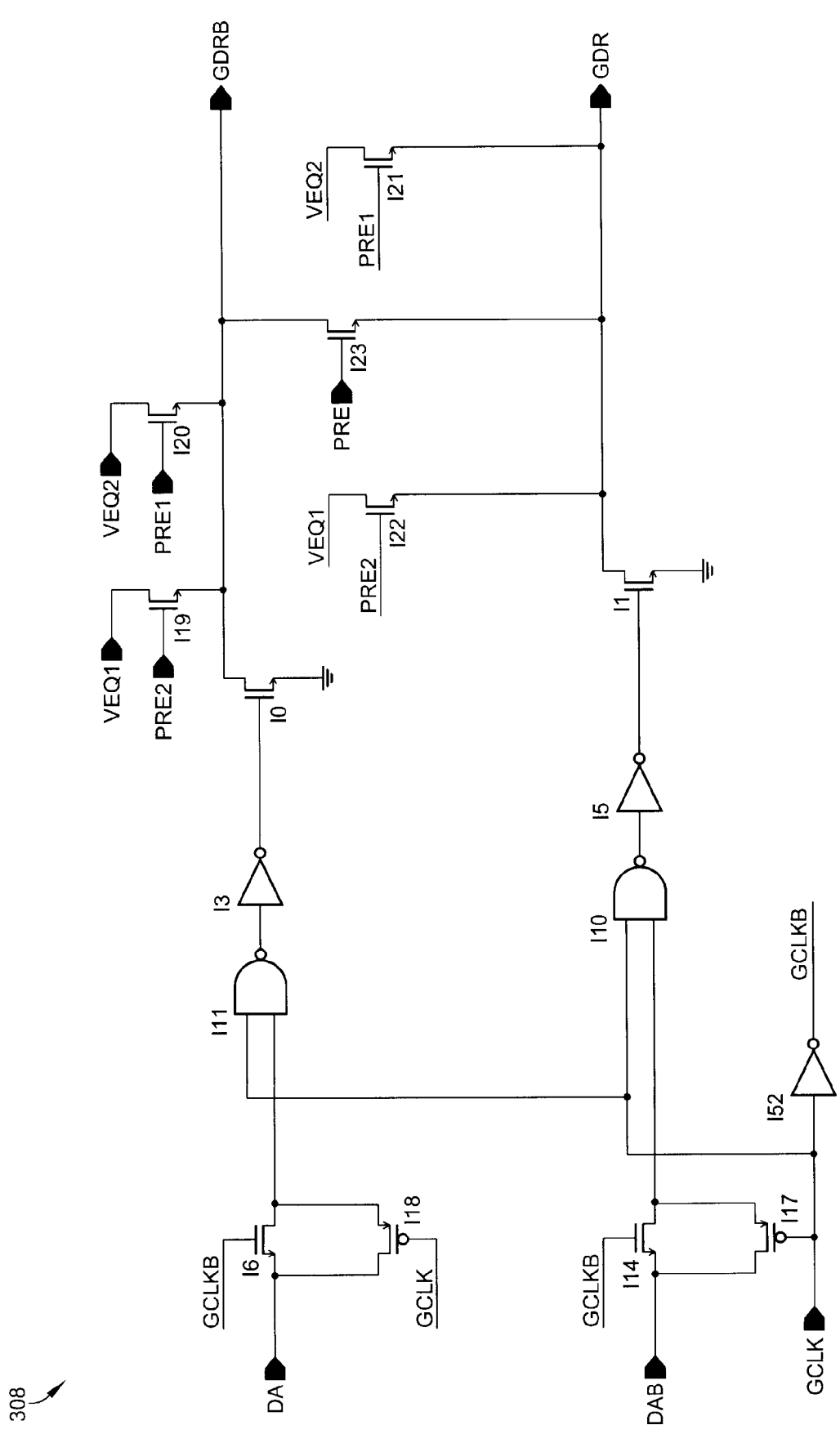
FIG. 9 is a schematic diagram of a drive circuit suitable for use in the charge sharing circuit of FIG. 3, according to the present invention.

FIG. 9 is a schematic diagram of a drive circuit 308 suitable for use in the charge sharing circuit 300 of FIG. 3, according to the present invention. Drive circuit 308 includes a pass gate I6/I18 coupled to the DA line and a pass gate I14/I17 coupled to the DAB line. The output of the pass gate I6/I18 is coupled to logic circuitry including NAND gate I11, inverter I3 and N-channel transistor I0. The output of the pass gate I14/I17 is coupled to logic circuitry including NAND gate I10, inverter I5 and N-channel transistor I1. Transistor I0 is coupled to the GDRB line. The GDRB line is equalized to the VEQ1 voltage by N-channel transistor I19 receiving the PRE2 control voltage. The GDRB line is equalized to the VEQ2 voltage by N-channel transistor I20 receiving the PRE1 control voltage. In turn, transistor I1 is coupled to the GDR line. The GDR line is equalized to the VEQ1 voltage by N-channel transistor I22 receiving the PRE2 control voltage. The GDR line is equalized to the VEQ2 voltage by N-channel transistor I21 receiving the PRE1 control voltage. N-channel transistor I22 is coupled across the GDR and GDRB lines for equalizing the voltage of these two lines under control of the PRE control voltage. In operation, drive circuit 308 is used to read the signal on the DA and DAB lines, and to drive these signals onto the GDR and GDRB lines, and also to precharge the GDR and GDRB lines to VEQ1 or VEQ2 depending on the state of PRE1 and PRE2 during the precharge portion of the cycle.

Figure 10:
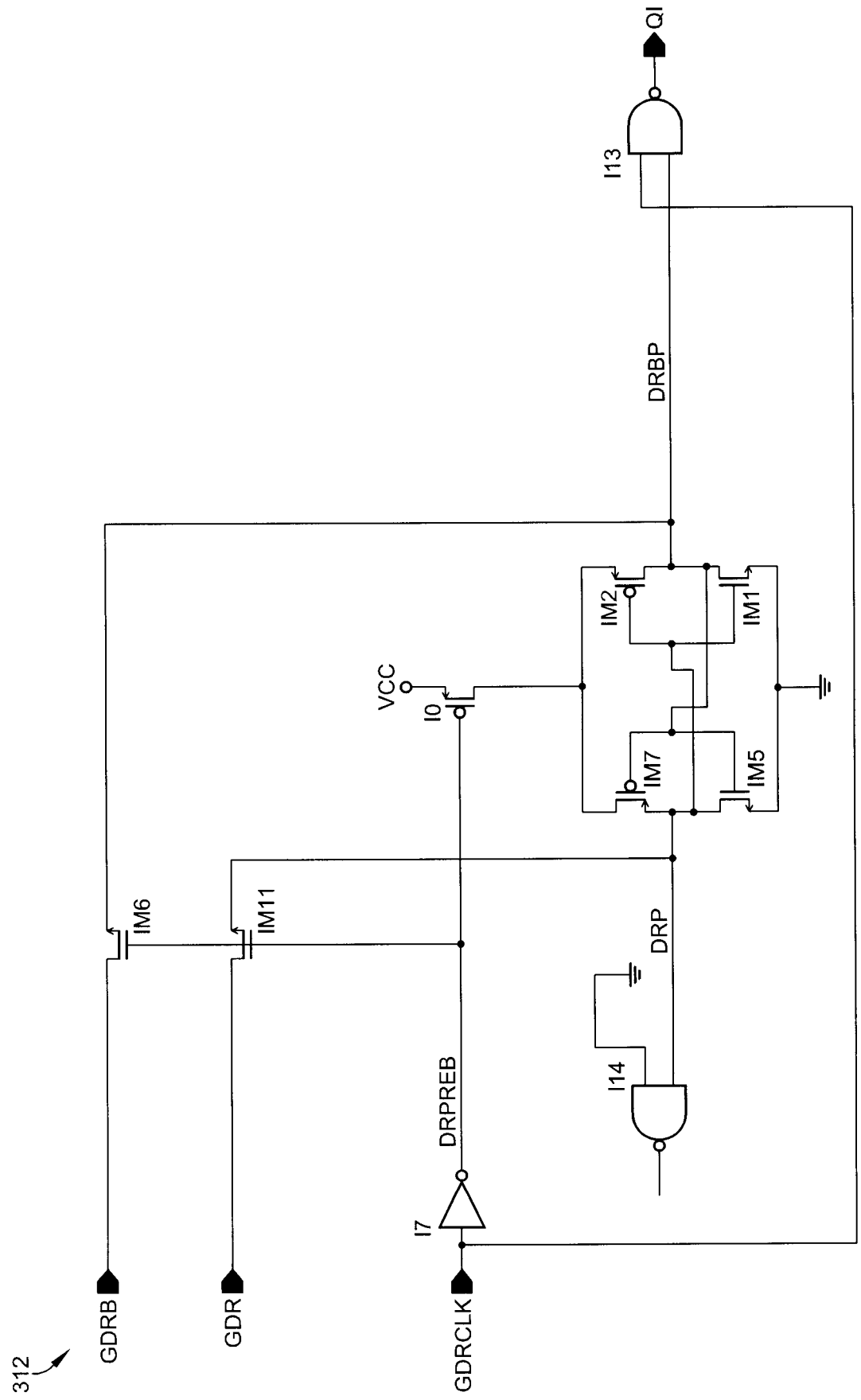
FIG. 10 is a schematic diagram of a global data amplifier circuit suitable for use in the charge sharing circuit of FIG. 3, according to the present invention.

FIG. 10 is a schematic diagram of a global data amplifier circuit 312 suitable for use in the charge sharing circuit 300 of FIG. 3, according to the present invention. N-channel transistors IM6 and IM11 are interposed between the GDR/GDRB lines and the DRP/DRBP lines, and are controlled at the gates thereof by the DRPREB control signal. The DRP and DRBP signals are resolved by the circuit portion including P-channel transistors I0, IM2, and IM7, and N-channel transistors IM1 and IM5. NAND gate I13 receives the GDRCLK and DRBP signals to provide the QI output signal. In operation, amplifier circuit 312 is used to resolve the GDRB and GDR signals, and to provide the drive capability for the QI output signal. A dummy NAND gate I14 is provided to equalize the capacitive loads on lines DRP and DRBP so that they each see similar gate loading and the latching amplifier made up of I0, IM1, IM2, IM5, and IM7 is balanced.

Figure 11:
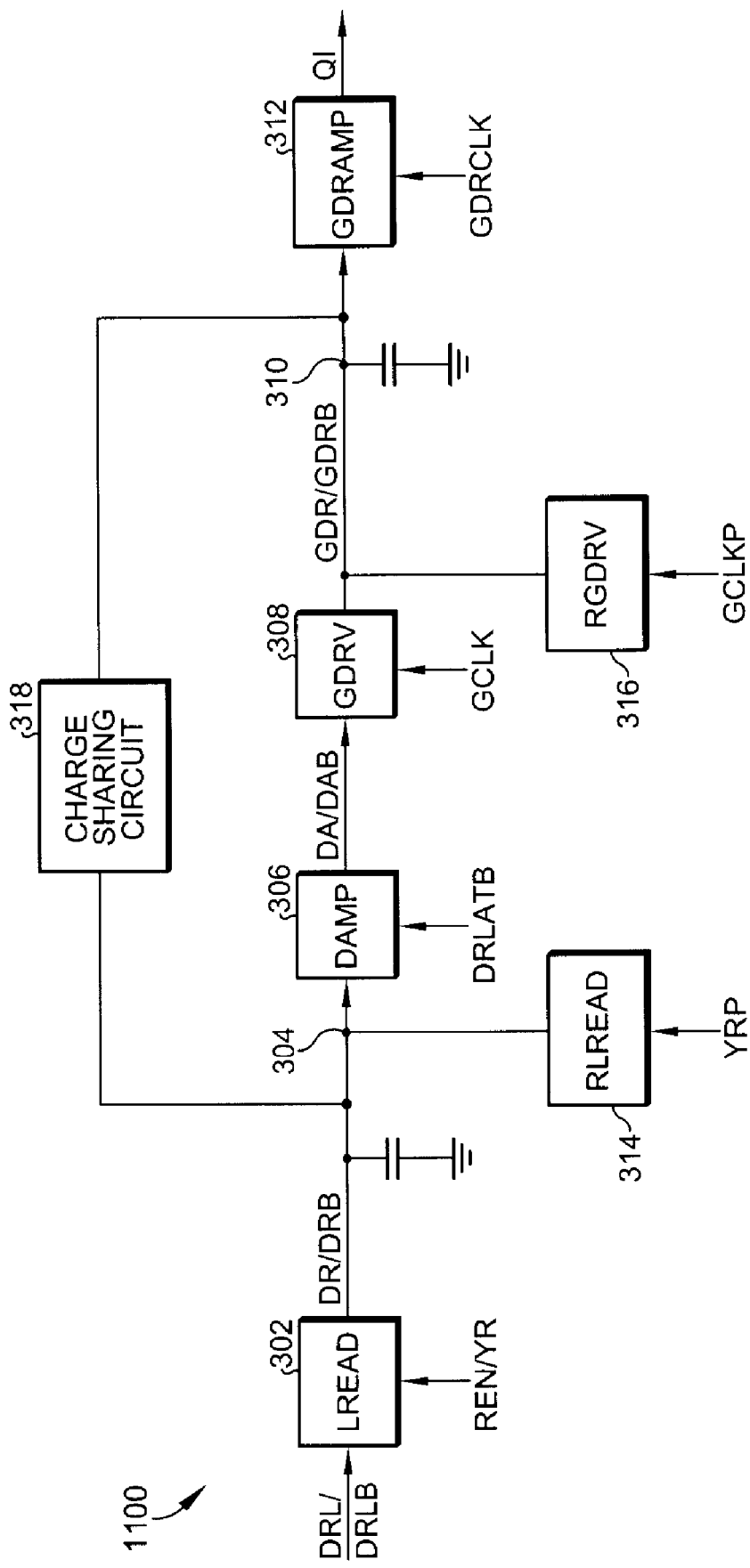
FIG. 11 is a schematic diagram of the circuit of FIG. 3 including a further charge recycling circuit.

FIG. 11 is a schematic diagram of a charge sharing circuit 1100 according to the present invention that is similar to the circuit 300 shown in FIG. 3. Circuit 1100 includes an additional charge recycling or sharing circuit 318. Circuit 318 is a switch capacitor or shorting transistor charge sharing or charge recycling circuit that is fully explained in the co-pending application entitled "Switched Capacitor Charge Sharing Technique for Integrated Circuit Devices Enabling Signal Generation of Disparate Selected Signal Values", Ser. No. 11/625,728 filed on Jan. 22, 2007. The function of circuit 318 is to ensure that the charge used to bring the DR/DRB lines low is also used to bring the GDR/GDRB lines high.

Glossary

DRL/DRLB—Data Read Local/Data Read Local Bar signals

REN/YR—Read ENable/Y address Read select signals

DR/DRB—Data Read/Data Read Bar signals

LREAD—Local READ circuit

RLREAD—Reference Local READ circuit

DAMP—Data AMPlifier circuit

DA/DAB—Data Amplifier output/Data Amplifier Bar output signals

GDRV—Gdr signal DRiVer circuit

RGDRV—Reference GDRV circuit

GDR/GDRB—Global Data Read/Global Data Read Bar signals

GDRAMP—GDR AMPlifier circuit

GDRCLK—GDR amplifier CLocK signal

Having described and illustrated the principle of the invention in a preferred embodiment thereof, it is appreciated by those having skill in the art that the invention can be modified in arrangement and detail without departing from such principles. Although a preferred method and circuit has been shown, the exact details of the preferred method and circuit can be changed as desired as required for a particular application. For example, a burst length of 64 or 128 can be used, although this is not illustrated in FIG. 2 or 4. We therefore claim all modifications and variations coming within the spirit and scope of the following claims.

We claim:

1. A charge sharing circuit comprising:
a local read circuit;
a first amplifier circuit;
a capacitive local data line coupled between the local read circuit and the first amplifier circuit;
a drive circuit coupled to the first amplifier circuit;
a second amplifier circuit for providing an output signal;
a capacitive global data line coupled between the drive circuit and the second amplifier circuit;
a reference local read circuit coupled to the local data line; and
a reference drive circuit coupled to the global data line,
wherein the reference local read circuit comprises:
an inverter having an input for receiving a control signal and an output, and
a P-channel transistor having a gate coupled to the output of the inverter and a current path coupled between the local data line and a source of power supply voltage.

2. The charge sharing circuit of claim 1 wherein the local read circuit receives a first control signal and the reference local read circuit receives a second control signal.

3. The charge sharing circuit of claim 2 wherein the second control signal occurs after the first control signal.

4. The charge sharing circuit of claim 1 wherein the drive circuit receives a first control signal and the reference drive circuit receives a second control signal.

5. The charge sharing circuit of claim 4 wherein the second control signal occurs before the first control signal.

6. The charge sharing circuit of claim 1 wherein the reference local read circuit comprises means for supplying an additional signal to the local data line.

7. The charge sharing circuit of claim 6 wherein the additional signal comprises a positive-going signal.

8. The charge sharing circuit of claim 1 wherein the reference drive circuit comprises means for supplying an additional signal to the global data line.

9. The charge sharing circuit of claim 8 wherein the additional signal comprises a negative-going signal.

10. The charge sharing circuit of claim 1 further comprising a charge recycling circuit coupled between the capacitive local data line and the capacitive global data line.

11. A charge sharing circuit comprising:
   a local read circuit;
   a first amplifier circuit;
   a capacitive local data line coupled between the local read circuit and the first amplifier circuit;
   a drive circuit coupled to the first amplifier circuit;
   a second amplifier circuit for providing an output signal;
   a capacitive global data line coupled between drive circuit and the second amplifier circuit;
   a reference local read circuit coupled to the local data line; and
   a reference drive circuit coupled to the global data line,
   wherein the reference drive circuit comprises:
      an inverter having an input for receiving a control signal and an output; and
      an N-channel transistor having a gate coupled to the output of the inverter and a current path coupled between the global data line and a source of reference voltage.

12. The charge sharing circuit of claim 11 wherein the local read circuit receives a first control signal and the reference local read circuit receives a second control signal.

13. The charge sharing circuit of claim 12 wherein the second control signal occurs after the first control signal.

14. The charge sharing circuit of claim 11 wherein the drive circuit receives a first control signal and the reference drive circuit receives a second control signal.

15. The charge sharing circuit of claim 14 wherein the second control signal occurs before the first control signal.

16. The charge sharing circuit of claim 11 wherein the reference local read circuit comprises means for supplying an additional signal to the local data line.

17. The charge sharing circuit of claim 16 wherein the additional signal comprises a positive-going signal.

18. The charge sharing circuit of claim 11 wherein the reference drive circuit comprises means for supplying an additional signal to the global data line.

19. The charge sharing circuit of claim 18 wherein the additional signal comprises a negative-going signal.

20. The charge sharing circuit of claim 11 further comprising a charge recycling circuit coupled between the capacitive local data line and the capacitive global data line.

* * * * *